(No Model.)
C. H. ROBBINS.
GAS BURNER.
No. 528,446. Patented Oct. 30, 1894.
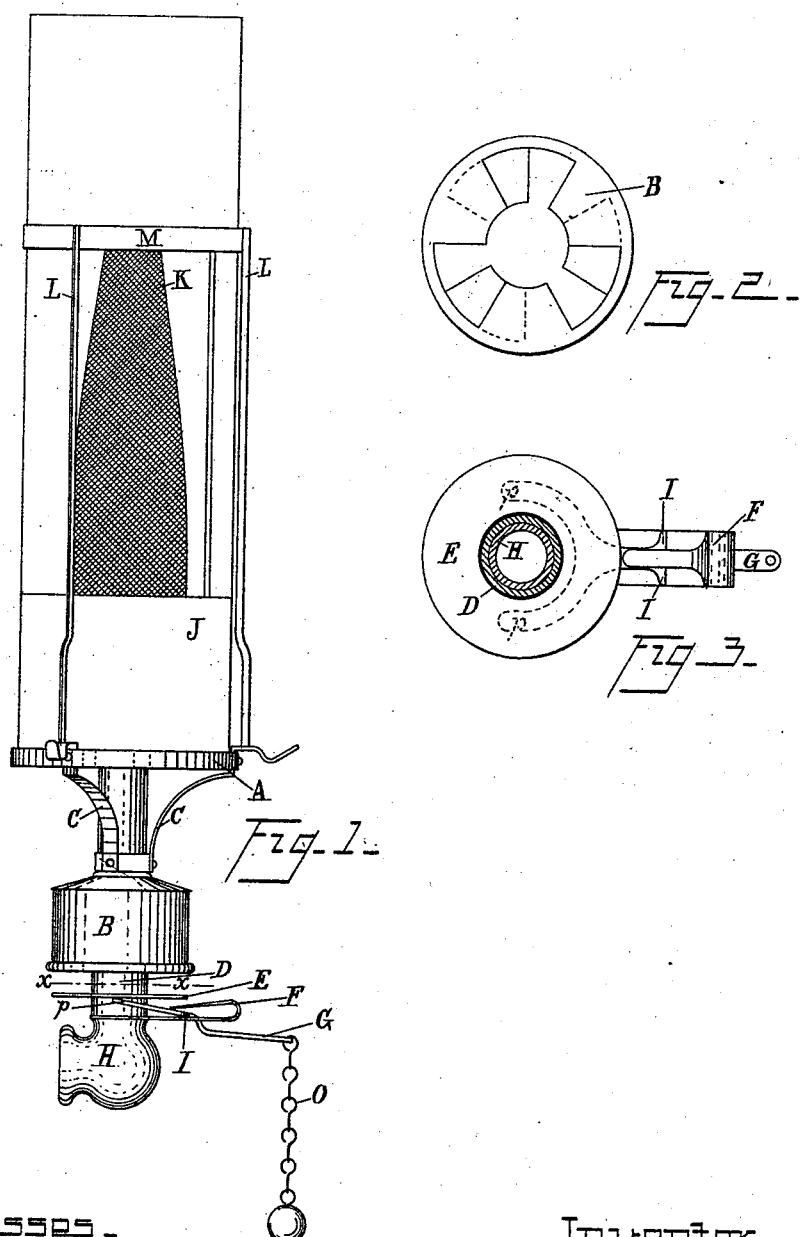
Witnesses
Henry B. Lothrop
Amelia J. Williams
Inventor
Charles H. Robbins
by Geo. H. Lothrop atty (No Model.)
2 Sheets—Sheet 2.
C. H. ROBBINS.
GAS BURNER.
No. 528,446.
Patented Oct. 30, 1894.
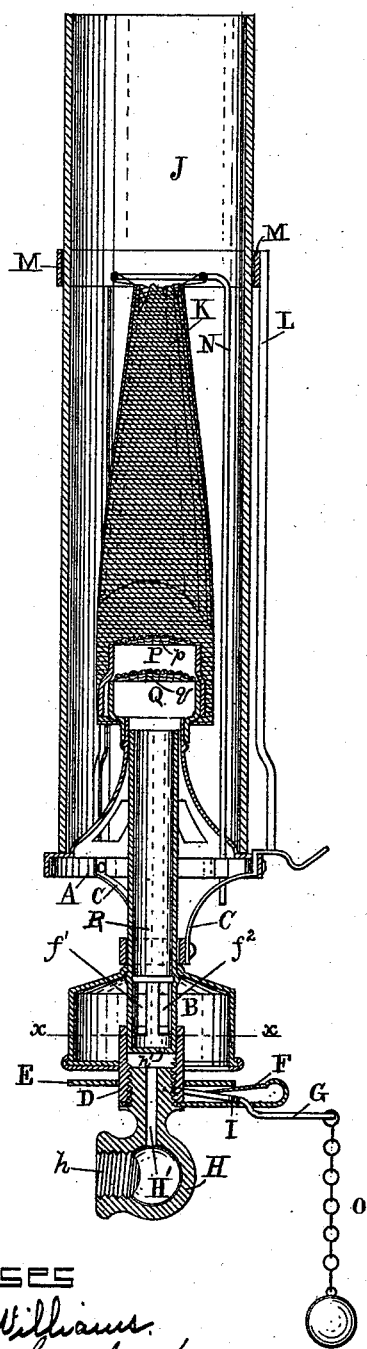
Fig. 1ᵃ
Witnesses
Amelia J. Williams
Henry C. Lothrop
Inventor
Charles H. Robbins
by Geo. H. Lothrop
atty

UNITED STATES PATENT OFFICE.

CHARLES H. ROBBINS, OF OWOSSO, ASSIGNOR OF ONE-HALF TO S. DEAN, OF ANN ARBOR, MICHIGAN.

GAS-BURNER.

SPECIFICATION forming part of Letters Patent No. 528,446, dated October 30, 1894.

Application filed January 18, 1894. Serial No. 497,290. (No model.)

*To all whom it may concern:*

Be it known that I, CHARLES H. ROBBINS, of Owosso, in the county of Shiawassee and State of Michigan, have invented a new and useful Improvement in Gas-Burners, of which the following is a specification.

My invention relates to improvements in gas burners of the "Bunsen" type, in which the gas is mixed with air before being burned, and its object is to provide a novel construction and arrangement of parts to prevent the explosion and lighting back which occur in burners of this class, as usually constructed, when the gas is first lighted.

To this end my invention consists in the novel features of construction and the new combination or arrangement of parts hereinafter described and claimed.

In the drawings—Figure 1 is a side elevation, and Fig. 1ª a vertical central section. Fig. 2 is a bottom plan view of the air leading-in chamber, and Fig. 3 is a section on the line $x$—$x$ of Figs. 1 and 1ª.

The reference-letter H represents an elbow adapted to be attached to a gas-pipe, secured to which is a pipe D for the passage of gas. Seating at its lower end in said pipe D is a combined gas and air conduit R terminating at its upper end in a burner, and in which the gas and air are mixed while on their way to the burner.

B represents a chamber which I term an air leading-in chamber, adapted to direct air into the combined gas and air conduit R, through open rings $f'$, $f^2$, formed in said conduit. This chamber may be of any known type, that shown in the drawings being a cylinder carried by the pipe D and conduit R, closed at its upper end and open at its lower end, so that the passage of a jet of gas through the pipe D and conduit R, draws air through said chamber and into the conduit R where it intermixes with the gas and the mixture passes up to the point where it is to be burned.

A represents a plate, usually perforated, supported by arms C on the conduit R, and on this plate is carried a glass or mica chimney J, the lower part of which may be ground as indicated in the drawings. The chimney J may be supported on the plate A in any desired way, the way illustrated being by arms L, secured on the plate A, and supporting a collar M, which encircles the chimney.

K represents a mantle of the "Welsbach" type, supported within the chimney J, and intended to be rendered incandescent by gas-flames, burning therein, the lower end of the mantle K being over the burner at the top of the conduit R. These mantles are very frail and their life is comparatively short, and I have discovered that their destruction is materially hastened by the sharp explosion which happens when the gas is first lighted, and also by the very objectionable feature known as lighting back, and that by avoiding this explosion and lighting back, the life of such mantles is materially lengthened.

To prevent the causation mentioned I provide a valve E adapted to close the air inlets of the leading-in chamber B. The shape of this valve will of course depend upon the style and shape of the chamber B, since there may be many forms thereof; but with the style of chamber shown it is a simple annulus of sheet-metal, sliding on the pipe D, and adapted when raised to close the air inlets in the chamber B. G represents a lever pivoted on an arm I, secured on the pipe D, and bifurcated, as in Fig. 3, in dotted lines, to embrace said pipe D and to have its ends, marked $p$, rest against the under side of valve E. The outer end of the lever G is provided with a pull O to operate the valve to shut off ingress of air to the leading-in chamber. It is highly desirable and advantageous to provide means whereby, when the gas has been ignited, the valve may drop into the position shown in Fig. 1, thus automatically exposing the air inlets of the leading-in chamber and permitting the passage of air to the conduit R. To effect this, the outer end of the arm I is bent backward so as to form a spring F, resting upon the upper side of the inner arm of the lever G to normally hold said inner arm depressed and permit the valve E to drop into the position shown in Fig. 1.

The operation of my invention is as follows: In lighting the gas, the outer end of the lever G is depressed by operating the pull O, until the valve E closes the air inlets in the chamber B, when the gas is turned on and lighted. At this time the fluid through the conduit R to the burner will be practically pure gas and not an explosive mixture. The result is that the gas lights smoothly, without shock or explosion, and thereby strain upon the mantle K is avoided. As soon as the gas is lighted, the pull O is released, when the spring F immediately depresses the inner arm of the lever G, permitting the valve E to open, and a supply of air to enter the chamber B and pass into the conduit R through the openings $f'$, $f^2$, where it mixes with the gas and a blue flame results. Any other form of valve and spring may be used, or the spring may be omitted by making the valve heavy enough to open by gravity.

Among the advantages attained by my invention are the prevention of explosion and of lighting back when the burner is lighted, and the consequent relief of the mantle from shock or concussion, and from smoking and blackening, thereby greatly adding to its life and illuminating power, and the modifying of the heat at the time of lighting, so that it gives time for the chimney to expand gradually, thus preventing breakage of the same.

Having thus described my invention, what I claim is—

1. In combination with a "Bunsen" burner and a mantle above said burner, a combined gas and air conduit, an automatically opening air valve adapted to shut off admission of air to the conduit, and means for operating said valve, substantially as described.

2. In combination with a "Bunsen" burner and a mantle above said burner, a combined gas and air conduit, an air leading-in chamber communicating with said conduit, and an automatically opening air valve adapted to shut off admission of air to the conduit, and means for operating said valve, substantially as described.

3. In combination with a conduit R, a leading-in chamber B and mantle K, a valve E, pivoted lever G, and spring F, substantially as described.

CHAS. H. ROBBINS.

Witnesses:
GILBERT R. LYON,
H. S. HADSALL.